Sept. 5, 1967  E. L. CLARKE ET AL  3,340,460
PROPORTIONAL POWER CONTROL SYSTEM
Original Filed Jan. 17, 1963  3 Sheets-Sheet 1
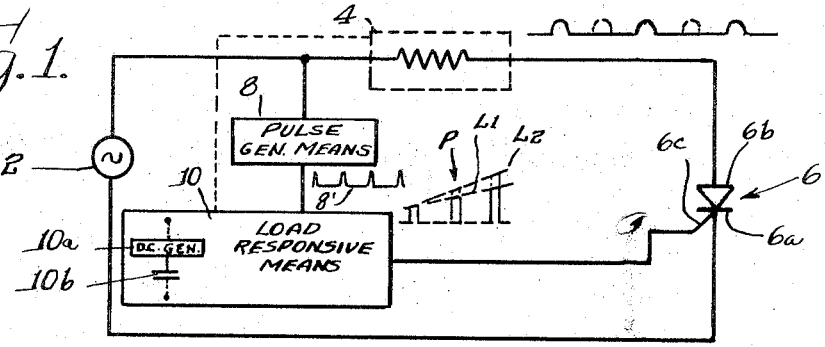
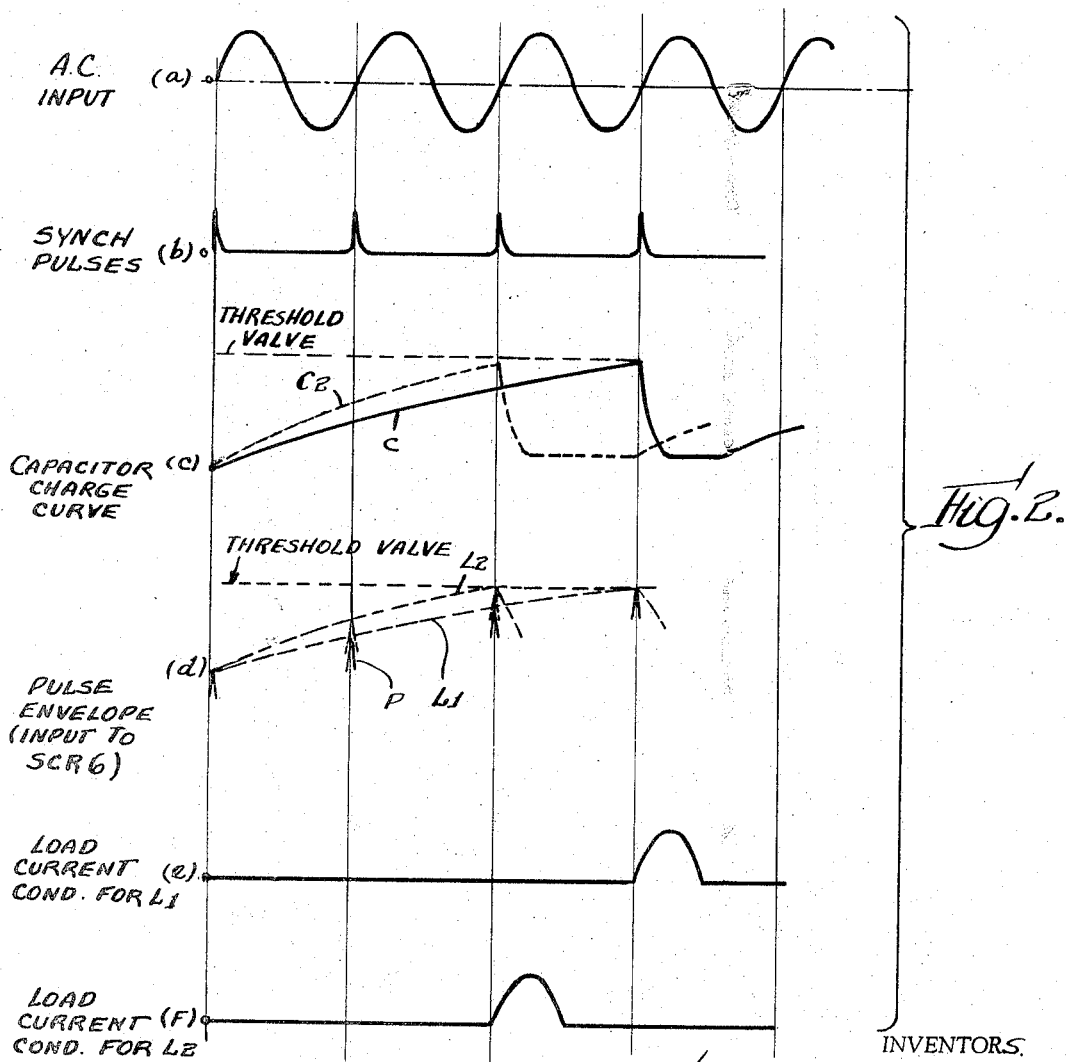
INVENTORS.
Edwin Louis Clarke
Alwyn Roberts Owens
By: Wallenstein, Spangenberg & Hattis
Attys.

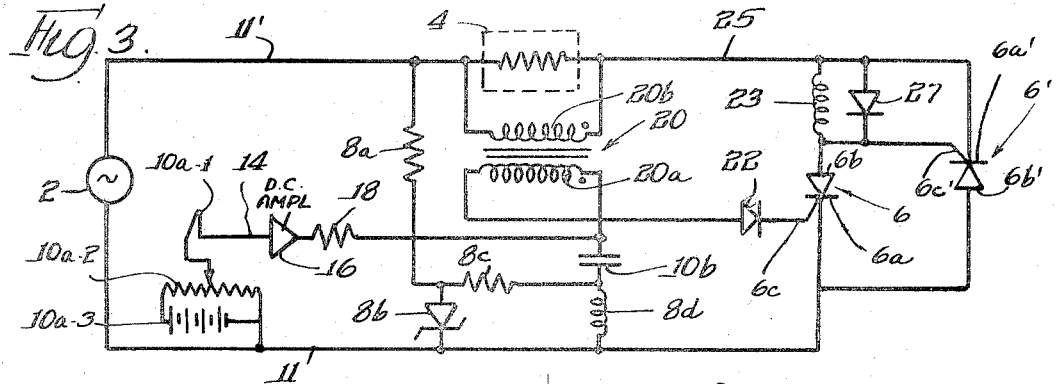
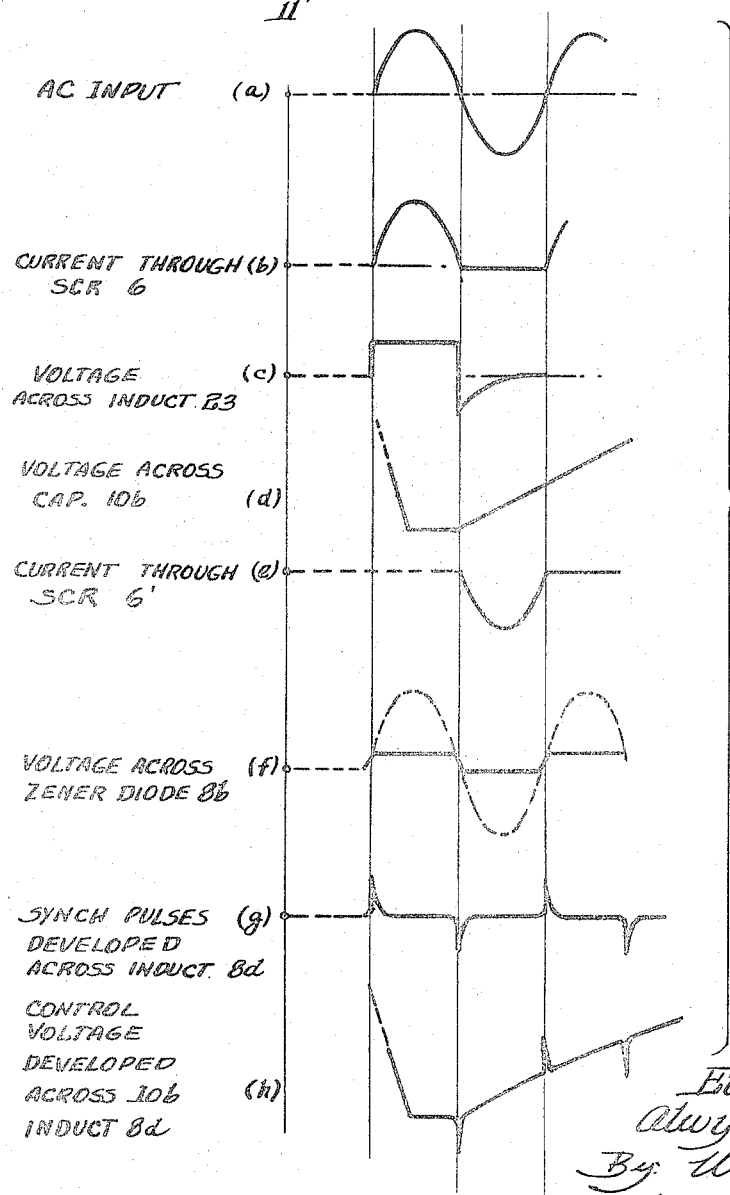

INVENTORS
Edwin Louis Clarke
Alwyn Roberts Owens
By: Wallerstein, Spangenberg & Hattis
Attys.

United States Patent Office 3,340,460
Patented Sept. 5, 1967

3,340,460
PROPORTIONAL POWER CONTROL SYSTEMS
Edwin L. Clarke and Alwyn R. Owens, Brighton, Sussex, England, assignors to West Instrument Limited, Brighton, Sussex, England, a corporation of Great Britain
Continuation of application Ser. No. 252,156, Jan. 17, 1963. This application July 1, 1966, Ser. No. 562,968
Claims priority, application Great Britain, Jan. 31, 1962, 3,769/62
3 Claims. (Cl. 323—22)

This invention relates generally to electrical power regulator circuits for controlling the flow of electric power to a load.

This application is a continuation of Ser. No. 252,156 filed Jan. 17, 1963, now abandoned.

One common way of controlling the amount of power fed to a load is to insert a current control device in series with the source of electrical power feeding the load, and utilizing the current control device as a gating device by rendering the same alternately conductive and non-conductive for varying relative time durations, depending upon the power requirements of the load. This arrangement is in effect a pulse width modulation of the power fed to the load. In cases where the source of electrical power is a source of alternating current, it is the practice to initiate conduction of the current control device at different controlled intervals during individual half cycles and to continue the conduction for the remainder of the half cycles. A variable phase controller responsive to the current (or voltage) conditions of the load determines the timing of the initiation of conduction of the current control device which is usually a silicon controlled rectifier, thyratron tube or similar device. Although this type of regulator circuit is useful and has proven satisfactory for many purposes, there is yet room for increased efficiency. One particular problem with this type of circuit is that the variable phase controller is usually an inductor device which results in a poor power factor.

It is an object of the present invention to provide a power regulator circuit or the like which stabilizes or regulates the flow of current to a load utilizing alternating current as the power source with improved power factor and efficiency. A related object of the invention is to provide a power regulating circuit as just described which is of simple and economical construction and which preferably utilizes, as a current control device betweeen the source of electric power and the load, semi-conductor devices, particularly silicon controlled rectifiers, sometimes referred to as gated diodes, and does not require any phase controller device which heretofore has resulted in a poor power factor.

In accordance with one aspect of the present invention, instead of controlling the current control device in series with the source of electric power so that it conducts for varying time intervals within a half cycle, the device is operated so that it always conducts for substantially a full half cycle which begins and terminates as the alternating current output is going through zero. Control over the average power in the load is here obtained by controlling the number of half cycle inervals in a given base period the current control device is rendered conductive.

In accordance with another aspect of the invention, the means for controlling the initiation of conduction of the current control device, which is preferably a silicon controlled rectifier having its cathode and anode terminals connected in series with the load and the source of alternating current, most advantageously includes a capacitor charge circuit which is fed by a direct current generating means which provides a direct current which has a magnitude proportional to the amount of additional power required by the load to maintain a given average power therein. Pulse generating means are also provided for generating narrow synchronizing pulses approximately coincident with the passage of the output of the source of alternating current through zero. Further means are provided responsive to the voltage charge on the capacitor and to the output of the pulse generating means for providing a group of pulses fed to the control electrode of the silicon controlled rectifier which pulses occur as the anode electrode of the rectifier begins to go positive with respect to the cathode electrode thereof, the peak values of the respective synchronizing pulses progressively increasing in value at a rate following the voltage charge waveform of the capacitor from a minimum value to a threshold value capable of triggering the silicon controlled rectifier device into a conductive state. A silicon controlled rectifier operates like a thyratron tube in that it fires when a positive control voltage is fed to its control electrode while the anode electrode is positive with respect to the cathode electrode. Also, once it fires, the control voltage on the control electrode looses control and the rectifier continues to conduct in accordance with the alternating voltage output of the source of alternating power connected thereto, until the polarity of the voltage on the anode and cathode electrode reverses. Upon conduction of the rectifier, a new group of synchronizing pulses are generated progressively increasing from said minimum value. The number of times in a given base period the silicon controlled rectifier is rendered conductive for a half cycle with the circuit arrangement just described is a function of the rate of increase of the magnitude of the synchronizing pulses which, in turn is a function of the power requirements of the load.

Other aspects of the invention relate to the means for generating the synchronizing pulses and other details of the regulator circuit which are described in the specification to follow, the claims and the drawings, wherein:

FIG. 1 is as simplified block diagram of an exemplary form of the present invention;

FIGS. 2(a) through 2(f) illustrate different waveforms present in the circuit illustrated in FIG. 1;

FIG. 3 is a circuit diagram illustrating a specific application of the form of the invention shown in FIG. 1;

FIGS. 4(a) through 4(h) illustrate different waveforms present in the circuit of FIG. 3;

Figure 6:
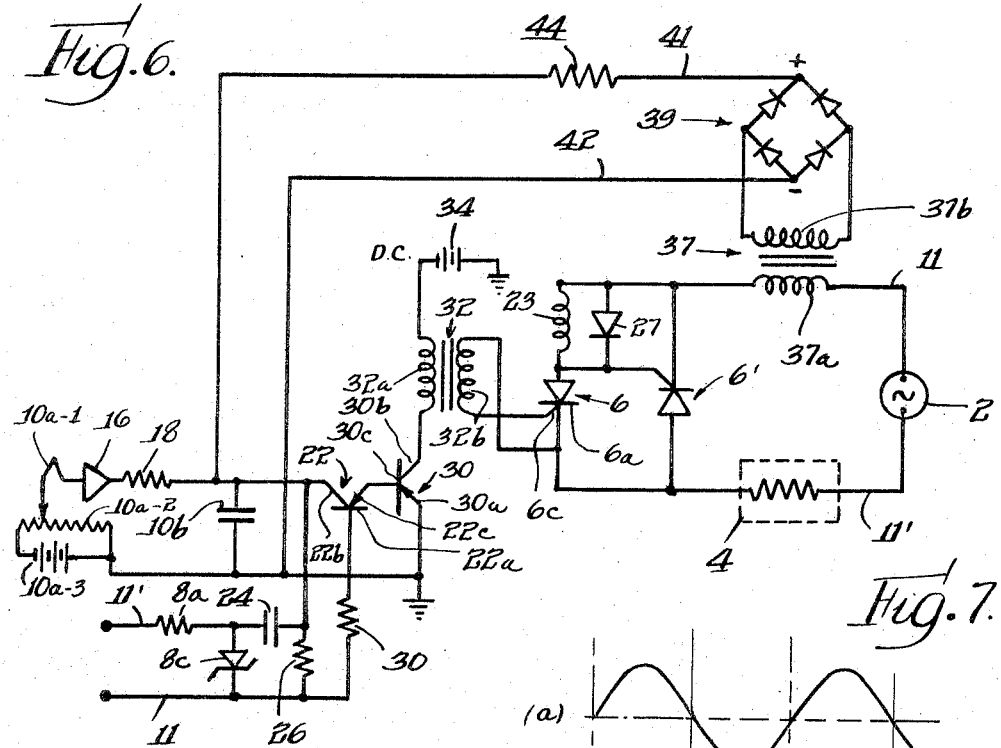
FIG. 6 is a circuit diagram of a still further modified form of the invention.

Referring now to FIG. 1, a source of alternating current 2 is shown connected in series with a load 4 of any type through which a given amount of power is to be fed and regulated. A current control device 6 (referred to in the claims as an electronic switch) shown in the form of a silicon controlled rectifier is provided having cathode and anode electrodes 6a and 6b connected in series between the load 4 and the source of alternating current 2. The silicon controlled rectifier 6 acts as a gating device which is initially triggered into a highly conductive state by the application of a positive control voltage having a given threshold or triggering value of the control electrode 6c thereof, while the applied voltage on the anode electrode 6b is positive relative to the cathode electrode 6a. Conduction of the rectifier 6 continues at a level depending upon the magnitude of the applied voltage independently of the magnitude of the control voltage, until the polarity of the applied voltage reverses, whereupon the device becomes relatively non-conductive.

The circuit further includes pulse generator means generally indicated by reference numeral 8 which generates synchronizing pulses 8' which occur as the anode electrode 6b begins to go positive with respect to the cathode electrode 6a. The output of the source of alternating current 2 is shown in FIG. 2(a) and the output of the pulse generating means is shown in FIG. 2(b).

A load responsive means 10 is provided which is responsive to the power being fed to the load 4. The load responsive means 10, in conjunction with the pulse generator means 8, periodically produce a group of synchronized control pulses P (FIGS. 1 and 2(d) with magnitudes which progressively increase from a minimum value to a threshold value capable of triggering the rectifier 6. The rate at which the peaks of these pulses increase in magnitude depends upon the additional power requirements of the load necessary to maintain a given predetermined load condition. The line L1 represents the envelope of the group of control pulses where a relatively small amount of additional power is required in the load whereas the steeper line L2 represents the envelope of the control pulses when a higher amount of power is required in the load. It can thus be appreciated that the steeper the envelope of the control pulses, the sooner will the threshold voltage which triggers the rectifier 6 to be reached.

When the rectifier 6 is rendered conductive, the rectifier 6 will be conductive for one half cycle, and a new group of control pulses will be generated starting from the same minimum value as before and progressively increasing toward a threshold value once again. It is apparent that the sooner the rectifier 6 becomes conductive due to a steeper rate of increase of the peak value of the synchronized control pulses, the greater the number of times in a given base period will the rectifier 6 be rendered conductive for a half cycle, and the greater the amount of power will be fed to the load 4. The circuit is thus automatically operative to maintain a given amount of power in the load 4 by virtue of the fact that the rate of increase of the magnitude of the synchronizing pulses is controlled in accordance with the additional power requirements of the load 4 to effect a predetermined average load condition.

In the most preferred form of the invention, the load responsive means 10 includes a direct current (D.C.) generator means 10a which generates a D.C. (or unidirectional) voltage of a magnitude proportional to the additional power requirements of the load 4, and a capacitor 10b connected in a circuit with a resistor or like impedance (not shown) forming a capacitor charge circuit. The solid and dotted curves C1 and C2 in FIG. 2(c) illustrate the voltage developed across the capacitor 10b respectively at relatively low and high D.C. input levels. For a given time constant of the capacitor charge circuit, the larger the input voltage the steeper will be the voltage charge waveform across the capacitor, and so the voltage curve C2 will reach a given value sooner than will the lower voltage curve C1. In various ways to be described, an effective synchronized control pulse waveform shown in FIG. 2(d) is produced having an envelope corresponding to the voltage waveform of the voltage developed across the capacitor 10b and increasing from a given minimum value to a value at or exceeding the threshold value required to trigger the rectifier 6. As soon as this threshold is reached and the rectifier 6 triggered into conduction, the capacitor 10b will be discharged and, when the rectifier 6 becomes non-conductive at the end of the half cycle involved, the capacitor will recharge again and the peak amplitude of the synchronizing control pulses will follow this waveform as before.

FIGS. 2(e) and 2(f) respectively show the half cycle of current which flows through the rectifier for the two power requirement conditions illustrated by the pulse envelope conditions depicted by line L2 and L1 in FIG. 2(a).

Reference should now be made to FIG. 3 which illustrates an exemplary circuit diagram of the form of the invention shown in FIG. 1. As there shown, the pulse generator means 8 comprises a resistor 8a and Zener diode 8b connected in series between power lines 11 and 11' leading to the opposite terminals of the source of alternating current. 2. The pulse generator means further includes a resistor 8c connected at the juncture of resistor 8a and the Zener diode 8b, on the one hand, and one terminal of the capacitor 10b, on the other hand. An inductance 8d is connected between the latter terminal of the capacitor 10b and power line 11. The Zener diode acts as a clipping device which clips the peaks of the alternating current voltage applied thereto in the manner illustrated by the solid line curve in FIG. 4(f). The resultant clipped waveform is differentiated by the network comprising the resistor 8c and the inductance 8d to produce across inductance 8d synchronizing pulses shown in FIG. 4(g). In a manner to be described, the negative pulses developed across inductance 8d are not effective in the circuit.

The D.C. generator means 10a may take a variety of forms as previously indicated. In the case, for example, where the load 4 is a heater or the like employed to maintain the temperature of some device, such as a furnace, the D.C. generator means 10a may most advantageously include a thermosensitive element, such as a thermocouple 10a–1, which is subjected to the temperature of the furnace. One terminal of the thermocouple is connected to the slide wire of a potentiometer 10a–2 whose opposite ends are connected to a direct current voltage source 10a–3. The negative end of the potentiometer is shown connected to the ground line 11 so that a positive voltage will appear on the slide wire of the potentiometer. The thermocouple 10a–1 generates a voltage in opposition to the voltage on the slide wire, so that the potential difference between an output terminal 14 connected to the other terminal of the thermocouple and the line 11 will be a measure of the additional power requirements of the load necessary to maintain a given temperature in the furnace.

Since the thermocouple is a low level signal device, it may be necessary to connect a direct current (D.C.) amplifier 16 between the terminal 14 and the power line 11 to amplify the direct current output thereat to a useful level. A resistor 18 is shown connected between the output of the D.C. amplifier 16 and the terminal of the capacitor 10b remote from the inductance 8d. It is apparent that the capacitor 10b will charge toward the direct current voltage of the D.C. amplifier 16.

The synchronizing pulses produced across the inductance 8d are superimposed upon this voltage in the manner illustrated in FIG. 4(h) since the inductance 8d across which these pulses are generated and the capacitor are connected in series in the control circuit of the silicon controlled rectifier 6.

The progressively increasing voltage waveform across the capacitor 10b with the superimposed pulses is coupled to the control electrode 6c of the silicon controlled rectifier 6 through the secondary winding 20a of a transformer 20. The transformer has a primary winding 20b connected across the heater coil 4 so that an output voltage will appear across the secondary winding 20a whenever current is flowing in the heater coil 4. The secondary winding 20a is connected through a rectifier 22 arranged to pass only positive voltages to the control electrode 6c of the silicon controlled rectifier 6. It will be assumed that the output of the D.C. amplifier 16 (and the capacitor voltage) will be a positive voltage under all conditions of circuit operation.

The circuit of FIG. 3 is designed to feed current through the heater coil 4 during the half cycle following the half cycle during which the gated diode 6 is conductive as well as the latter half cycle. To this end, a second silicon controlled rectifier 6' is provided whose cathode and anode terminals 6a' and 6b' are respectively connected in parallel with, and in inverse relation to, the cathode and anode electrodes 6b and 6a of the rectifier 6. The rectifier 6' has a control electrode 6c' which is connected to the juncture between the anode electrode 6b of the rectifier 6 and an inductance 23. The latter is connected to a line 25 connected to the end of the heater coil 4 opposite the end connected to the source of alternating current 2. A rectifier 27 is provided having an anode electrode connected to the line 25 and a cathode electrode connected to the anode electrode side of the inductance 23.

FIG. 4(b) shows the current passing through the rectifier 6 when the same is rendered conductive in the manner previously explained. FIG. 4(c) shows the voltage developed across the inductance 23 by the current flowing through the rectifier 6.

When the rectifier 6 is rendered conductive, the capacitor 10b will discharge through the cathode and control electrode of the rectifier 6 and will remain discharged until the current flow through the heater coil 4 reverses. The discharge of the capacitor is aided by the voltage developed in the secondary transformer winding 20a which, during current flow through the heater coil 4 in one direction, has a voltage induced therein which charges the capacitor in the opposite direction to the charge thereon due to the output of the thermocouple circuit. As soon as the rectifier 6 is rendered non-conductive, the voltage across the capacitor 10b begins to charge up once again toward a value equal to the magnitude of the output of the D.C. amplifier 16, to initiate a new cycle of operation of the circuit.

It will be noted from FIG. 4(c) that, upon termination of the conduction of the rectifier 6, a back E.M.F. pulse is produced. This back E.M.F. triggers the rectifier 6' into conduction which then receives a voltage of proper polarity from the source of alternating current 2 which has just reversed its polarity. The rectifier 6' will obviously conduct current in the opposite direction from the rectifier 6. The rectifier 27 connected across the inductance 23 is provided to limit the voltage drop across the inductance 23, for example, to about one volt.

Figure 5:
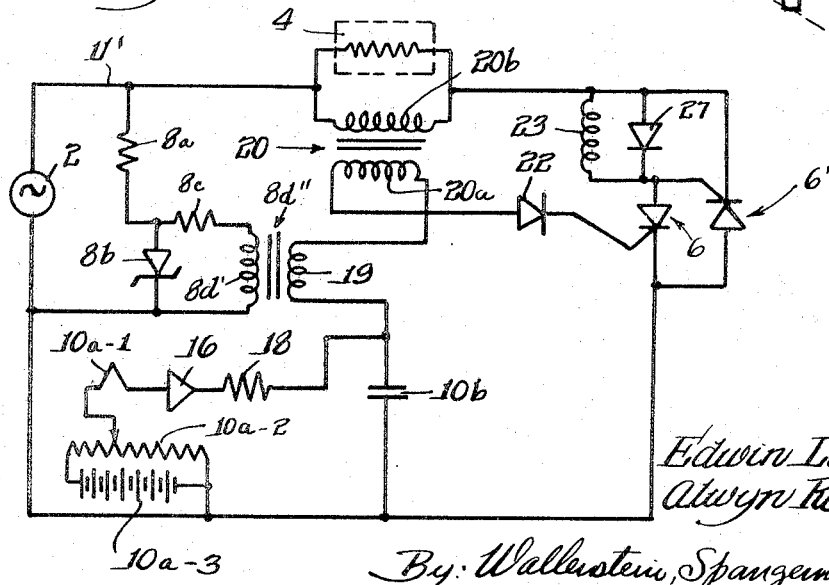
FIG. 5 is a circuit diagram of a modified form of the invention from that shown in FIG. 3.

Refer now to FIG. 5 which shows a circuit similar to that just described in connection with FIG. 3 except that a modified pulse generating circuit is shown therein. In this form of the invention, the bottom terminal of the capacitor 10b is connected directly to the line 11, and the pulse generating means includes, as before, a resistor 8a and a Zener diode 8b connected in series between the lines 11 and 11'. The differentiating network includes the resistor 8c connected to the anode electrode of the Zener diode 8b and the primary winding 8d' of a transformer 8d''. The inductance of the primary winding 8d' of a transformer 8d''. The inductance of the primary winding 8d' acts in the same manner as the inductance 8d in the form of the invention shown in FIG. 3. Synchronizing pulses developed in the primary winding 8d' are inductively coupled to the secondary winding 19 of the transformer 8d'' which winding is connected in series between the upper terminal of the capacitor 10b and the right hand end of the secondary winding 20a of the transformer 20. It is apparent that the synchronizing pulses are superimposed on the output waveform of the capacitor 10b to form a composite waveform like that shown in FIG. 4(h).

It will be recalled that the basic objective of the pulse generating means 8 and the load responsive means 10 (FIG. 1) is to provide a series of synchronizing control pulses P which progressively increase in magnitude in accordance with the voltage charge waveform of capacitor 10b. This result is achieved in the form of the invention shown in FIG. 6 in a different manner from that in the embodiment of the invention shown in FIGS. 3 and 5.

To this end, reference should now be made to FIG. 6 where this result is achieved by feeding the output of the capacitor 10b to a gating transistor or similar current control device 22, and gating the voltage across the capacitor 10b into the control circuit of the rectifier 6 periodically as the output of the source of alternating current 2 goes through zero, by means of the synchronizing pulses generated by the pulse control means 8. The input circuit to the capacitor 10b from the thermocouple circuit is the same as that shown and previously described in connection with FIG. 5, except that the latter circuit is arranged to couple a negative rather than a positive voltage as before. The negative side of the capacitor 10b is connected to the collector electrode 22b of the transistor 22 which is shown as PNP type transistor, and the relatively positive terminal thereof is grounded. The base electrode 22a of this transistor is coupled through a resistor 30 to resistor 26 across which the synchronizing pulses are developed. The end of the resistor 26 remote from the resistor 30 is connected to the collector electrode of the transistor 22 so that the synchronizing pulses will render the transistor 22 conductive.

The pulse generating circuit means 8 in FIG. 6 is similar to the circuits previously described in that it includes a resistor 8a and a Zener diode 8b connected in series between the power lines 11' and 11. However, the differentiating network in this form of the invention is a capacitor-resistor type wherein a capacitor 24 and a resistor 26 are connected across the Zener diode 8b. Synchronizing pulses occurring as the output terminal of the source of alternating current connected to the anode electrode of the silicon controlled rectifier 6 begins to go positive will appear across resistor 26.

Figure 7:
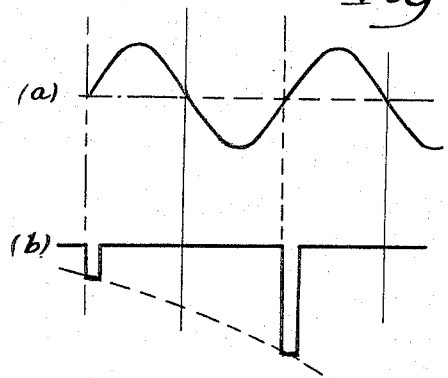
FIGS. 7(a) and (b) illustrates waveforms present in the circuit of FIG. 6.

The transistor 22 is operated in conjunction with a PNP control transistor 30 having a grounded emitter electrode 30a, a collector electrode 30b connected through the primary winding 32a of a transformer 32 to the negative terminal of a source of direct current 34, and a base electrode 30c connected to the emitter electrode 22c of the transistor 22. Since the bottom terminal of the capacitor 10b is grounded, it will be apparent that when the transistor 22 is rendered conductive by the application of a pulse of proper polarity to its base circuit, the transistor 22 will momentarily conduct an amount in proportion to the value of the voltage across the capacitor 10b at that instant. The current flowing through the emitter to collector electrodes of the transistor 22 will flow through the emitter to base circuit of the transistor 30. Transistor 30 acts as a current amplifier which produces current pulsations in the primary of the transformer 32a having an amplitude proportional to the current pulses through transistor 22. These current pulsations progressively increase in magnitude in accordance with the voltage across the capacitor 10b at the instant the transistor 22 is rendered conductive, as illustrated by FIG. 7(b). (FIG. 7(a) illustrates the waveform of the source of alternating current 2 to show the relationship between the current pulsation of the primary winding 32a and the instants the alternating current waveform of the source 2 goes through zero.) The current pulsations produced in the primary winding 32a of the transformer 32 appear in the secondary winding 32b of the transformer 32. The opposite ends of the secondary windings 32b are connected respectively to the control electrode 6c of the silicon control rectifier 6 and the cathode electrode 6a thereof.

The silicon controlled rectifiers 6 and 6' in FIG. 6 operate in the same manner as described in connection with the embodiment of the invention shown in FIG. 3 in that each time the rectifier 6 is triggered into conduction it will conduct for a full half cycle following which the other rectifier 6' will be conductive for a full half cycle.

It will be recalled that in the circuit of FIG. 3 means were provided for preventing recharge of the capacitor 10b until the end of the conduction of the rectifier 6. To this end, a transformer 37 is provided having a primary winding 37a through which flows the load current. The secondary winding 37b of this transformer extends to the opposite ends of a conventional full wave rectifier network 39 which produces a positive voltage at an output terminal to which an output line 41 connected during the flow of current through the transformer 37, which coincides with the flow of current through the rectifier 6 and 6'. The line 41 is connected through a resistor 44 to the normally negative end of the capacitor 10b. Another line 42 leads to the other output terminal of the rectifier network 39 and is grounded. It will thus be seen that each time the load current flows to the load 4, capacitor 10b will be discharged by the positive potential fed thereto from the rectifier network 39. The capacitor 10b will recharge when conduction ceases in the rectifier 6 and 6'.

In the various forms of the invention, applicant has provided a very simple, economical and effective circuit for controlling the amount of power flowing in a load without the need of any variable phase controller circuits using inductors and the like which adversely affect the power factor of the power system.

It should be understood that numerous modifications may be made of the most preferred forms of the invention described above without deviating from the broader aspects of the invention.

We claim:
1. In a circuit including a load and a source of alternating curent for supplying power to said load, power regulating means for regulating the power from said source to said load comprising: electronic switch means having a pair of load terminals connected in series between said source of alternating current and said load and a control terminal adapted to trigger the switch means into uncontrolled conduction when a control voltage of a given threshold value is fed thereto and an energizing voltage of a given polarity is fed to said load terminals from said source of alternating current, load responsive pulse genterating control means for repeatedly generating a group of pulses coincident with the instants the output of the source of alternating current passes through zero, the peak magnitudes of the respective pulses progressively increasing in value from a minimum value far below said threshold value to a value at least equal to said threshold value and at a rate dependent upon the additional power requirements of the load to maintain a given average power therein, means connecting the output of said load responsive pulse generating control means to the control terminal of said electronic switch means for effecting the triggering thereof for substantially a full half cycle when the peak value of said pulses fed to said control terminal reaches said threshold value, and means responsive to the triggering of said electronic switch means for initiating the generation of a new group of pulses by said load responsive pulse generating control means wherein the peak magnitude of the pulses of the group progressively increase from said minimum value.

2. In a circuit including a load and a source of alternating current for supplying power to said load, a power regulating circuit for regulating the power fed from said source of said load comprising: electronic switch means having cathode and anode terminals connected in series between said load and a source of alternating current, said electronic switch means having a control terminal which effects uncontrolled conduction of the associated electronic switch means when a control voltage of at least a given threshold value is fed thereto and the voltage fed to said cathode and anode terminals from said source of alternating current is of a given polarity, load responsive means responsive to the power fed to said load and an adjustable preset standard generating a direct curent voltage whose magnitude is at least as great as said threshold value and which is a function of the difference between the actual and desired power flowing in said load, a capacitor charge circuit fed by the output of said load responsive means and including a capacitor which gradually charges toward said threshold value, means for superimposing on the capacitor charge waveform of said capacitor a series of pulses of a fixed amplitude, the peak of each superimposed pulse at least reaching the base of the next succeeding superimposed pulse, and the pulse occurring coincident with the initiation of new half cycles of the output of said source of alternating current, means for coupling the composite capacitor charge waveform to the control terminal of said electronic switch means to effect the triggering thereof when the peak value of one of the superimposed pulses reaches said threshold value, occurring in a time which is the function of the slope of said waveform, in turn dependent upon the magnitude of the direct current output of said load responsive means, the conduction of said electronic switch means thereby lasting for a full half cycle, and means responsive to the conduction of said electronic switch means for discharging said capacitor to initiate a new capacitor charge cycle.

3. In a circuit including a load and a source of alternating current for supplying power to said load, a power regulating circuit for regulating the power fed from said source of said load comprising: electronic switch means having cathode and anode terminals connected in series between said load and source of alternating current, said electronic switch means having a control terminal which effects uncontrolled conduction of the associated electronic switch means when a control voltage of at least a given threshold value is fed thereto and the voltage fed to said cathode and anode terminals from said source of alternating current is of a given polarity, load responsive means responsive to the power fed to said load and an adjustable preset standard by generating a direct current voltage whose magnitude is at least as great as said threshold value and which is a function of the difference between the actual and desired power flowing in said load, a capacitor charge circuit fed by the output of said load responsive means and including a capacitor which gradually charges toward said threshold value, means for periodically gating the output of said capacitor to the control terminal of said electronic switch means for short intervals coincident with the initiation of new half cycles of the output of said source of alternating current, wherein the voltage at said control terminal reaches said threshold value in a time proportional to the additional power requirements of the load and at an instant when the output of said source of alternating current begins a new half cycle, the conduction of said electronic switch means thereby lasting for a full half cycle, and means responsive to the conduction of said electronic switch means for discharging said capacitor to initiate a new capacitor charge cycle.

References Cited

UNITED STATES PATENTS

| 3,204,113 | 8/1965 | Snygg | 307—88.5 |
| 3,283,179 | 11/1966 | Carlisle et al. | 307—133 |
| 3,299,346 | 1/1967 | Gambill | 323—22 |
| 3,305,766 | 2/1967 | Gambill | 323—22 |
| 3,307,094 | 2/1967 | Ogle | 318—345 X |

JOHN F. COUCH, *Primary Examiner.*

K. D. MOORE, W. M. SHOOP, *Assistant Examiners.*